US008566433B2

(12) United States Patent
Soelberg et al.

(10) Patent No.: US 8,566,433 B2
(45) Date of Patent: Oct. 22, 2013

(54) METHODS AND APPARATUSES FOR PROVIDING LOCATION BASED RATINGS SERVICES ON COMMUNICATIONS NETWORKS

(75) Inventors: Emily Soelberg, Atlanta, GA (US); Jeffrey Mikan, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 677 days.

(21) Appl. No.: 12/343,068

(22) Filed: Dec. 23, 2008

(65) Prior Publication Data
US 2010/0161718 A1    Jun. 24, 2010

(51) Int. Cl.
*G06F 15/173*    (2006.01)

(52) U.S. Cl.
USPC ........................................ 709/223; 455/404.2

(58) Field of Classification Search
USPC .......................................................... 709/223
See application file for complete search history.

(56) References Cited

U.S. PATENT DOCUMENTS

| | | | |
|---|---|---|---|
| 2005/0043060 A1* | 2/2005 | Brandenberg et al. | 455/558 |
| 2007/0032244 A1* | 2/2007 | Counts et al. | 455/456.1 |
| 2007/0050360 A1* | 3/2007 | Hull et al. | 707/6 |
| 2007/0106627 A1* | 5/2007 | Srivastava et al. | 706/20 |
| 2008/0132251 A1* | 6/2008 | Altman et al. | 455/457 |
| 2008/0195457 A1* | 8/2008 | Sherman et al. | 705/10 |
| 2009/0027223 A1* | 1/2009 | Hill | 340/686.6 |
| 2009/0149200 A1* | 6/2009 | Jayasinghe et al. | 455/456.3 |
| 2010/0076968 A1* | 3/2010 | Boyns et al. | 707/732 |
| 2010/0161507 A1* | 6/2010 | Mckenzie, III | 705/347 |
| 2011/0295699 A1* | 12/2011 | Flinn et al. | 705/14.69 |

* cited by examiner

*Primary Examiner* — Tauqir Hussain
(74) *Attorney, Agent, or Firm* — Parks IP Law LLC; Mickki D. Murray, Esq.

(57) ABSTRACT

Systems and methods for providing location based ratings services on communications networks are disclosed. Location information relating to a device, or a user associated with the device, associated with a submitted rating can be associated with a rating and stored as part of the rating. Ratings can be sorted, filtered, and/or prioritized based upon associated location information. The location information can indicate where the rating is submitted, the billing address associated with the device used to submit the rating, the location of the device when the rating was submitted, the current location of the user who submitted the rating, whether the device was roaming when the rating was submitted, if an address associated with the device is near the rated business, where the device user lives, and the like. Methods and computer-readable media embodying methods for providing differentiated user service options, are also disclosed.

14 Claims, 8 Drawing Sheets

METHODS AND APPARATUSES FOR PROVIDING LOCATION BASED RATINGS SERVICES ON COMMUNICATIONS NETWORKS

TECHNICAL FIELD

The present disclosure relates generally to communications networks and, more particularly, to methods and apparatuses for providing location based ratings services on communications networks.

BACKGROUND

Over the past several years, the use of mobile communications devices and networks has increased. Some communications networks include devices and software for providing users with location based services. Location based services (LBS) can use the location of devices to provide users with services tailored to a particular location. Network operators also can use location information to analyze network infrastructure, usage patterns, and the like, to monitor maintenance, planning, and operational issues, if desired. Some wireless devices include global positioning system (GPS) capability for determining the location of the wireless device for navigation, rescue, or other purposes. Some devices include other systems and methods of determining the location of the device such as, but not limited to, triangulation using network and/or WIFI® resources, assisted GPS (A-GPS), E911, satellite links, and the like.

With the increasing sophistication of communications devices, communications networks, and communications device users, some sophisticated device capabilities are becoming more commonplace. For example, visual voicemail, navigation applications, Internet applications, e-commerce applications, social networking applications, and the like, which were until recently unavailable for many communications devices, are becoming popular features and/or applications for some accounts and devices. Other sophisticated device and network capabilities can be implemented by communications network operators, application authors, and/or communications device manufacturers to provide users with new services. For example, location based services can be provided for users of communications networks. Location based services can tailor services and device capabilities based upon the location of the device, for example.

SUMMARY

According to exemplary embodiments of the present disclosure, a user is provided with the ability to generate and retrieve location based ratings on communications networks. According to some embodiments of the present disclosure, location information relating to the party submitting a rating can be associated with a rating and stored as part of the rating. Ratings retrieved by users can be sorted, filtered, and/or prioritized based upon associated location information. The location information can indicate where the rating is submitted, the billing address associated with the device used to submit the rating, the location of the device when the rating was submitted, whether the device was roaming when the rating was submitted, if an address associated with the device is near the rated business, where the device user lives, and the like.

Including location information in ratings can give users the ability to subjectively determine the reliability of the rating information based upon personal or established criteria, if desired. For example, a restaurant rating submitted by someone whose billing or home address is over 100 miles away could be deemed less reliable than a more local user. For example, the user may have different tastes, may have had a bad experience, may have received substandard service, and/or the like. These and other considerations can be taken into account while reviewing location based ratings.

According to an exemplary embodiment of the present disclosure, a system for providing location based ratings services to a device operating on a communications network can include a location based ratings server. The location based ratings server can include a memory for storing computer-readable instructions. The computer-readable instructions can be executed by a processor to make the location based ratings server operable to recognize received data as ratings data submitted by a device; determine if location information associated with the device can be obtained; obtain location information associated with the device, if the location based ratings server so determines; associate the location information with the ratings data; and store the ratings data and the location information in a storage location associated with the system.

In some embodiments, the location based ratings server can obtain location information associated with the device by passing an identification string associated with the device to a location server; and recognizing received data as location information associated with the device. In some embodiments, the location based ratings server can obtain location information associated with the device by passing an identification string associated with the device to a user identification server; recognizing received data as identification data associated with the device; passing the identification data to a location server; and recognizing received data as location information associated with the device. The user identification server can be a home location register (HLR) or a home subscriber server (HSS) of a cellular network.

In some embodiments, the location based ratings server can recognize received data as a request for location information. The location based ratings server also can examine device data received from a ratings server, the device data including an identification string associated with the device; and determine, based on the device data, if the device is capable of providing the requested location information. The location based ratings server also can retrieve account information associated with the device, the account information including a city and a state.

In some embodiments, the location based ratings server can associate the location information with the ratings data by formatting the locations information as a data field in a database entry for the ratings data received from the device. Two or more ratings can be organized based upon the location information associated with the ratings.

According to another exemplary embodiment of the present disclosure, a method for providing location based ratings services to a device operating on a communications network can include recognizing data received at a location based ratings server as ratings data submitted by the device; determining, at the location based ratings server, if location information associated with the device can be obtained; obtaining location information associated with the device, if the location based ratings server so determines; associating the location information with the ratings data; and storing the ratings data and the location information in a storage location.

In some embodiments, obtaining location information further includes passing an identification string associated with the device to a location server; and recognizing data received from the location server as location information, the location information including data indicating the location of the device. In some embodiments, obtaining location information further includes passing an identification string associated with the device to a user identification server; recognizing data received from the user identification server as identification data associated with the device; passing the identification data to a location server; and recognizing data received from the location server as location information, the location information including data indicating the location of the device. In some embodiments, received data is recognized by the locations based ratings server as a request for location information.

In some embodiments, determining if location information associated with the device can be obtained includes examining, at the location based ratings server, device data received from a ratings server, the device data including an identification string associated with the device; and determining at the location based ratings server, based on the device data, if the device is capable of providing the requested location information. The method also can include retrieving account information associated with the device, the account information including a city and a state. Associating the location information with the ratings data can include formatting the locations information as a data field in a database entry for the ratings data received from the device. Two or more ratings can be organized based upon the location information associated with the ratings.

In another exemplary embodiment of the present disclosure, a computer-readable medium includes computer-readable instructions. The computer-readable instructions are executable by a processor to perform the steps of recognizing data received at a first node of a communications network as ratings data submitted by the device; determining, at the first node of the communications network, if location information associated with the device can be obtained; obtaining location information associated with a device in communication with the first node of the communications network, if the first node of the communications network determines that location information associated with the device can be obtained; associating the location information with the ratings data; storing the ratings data and the location information in a storage location; and storing the ratings data without location information if the location information associated with the device can not be obtained.

In some embodiments, the computer-readable instructions for obtaining location information further include computer-readable instructions, executable by the processor to perform the steps of passing an identification string associated with the device to a second node of the communications network; and recognizing data received from the second node of the communications network as location information, the location information including data indicating the location of the device. In some embodiments, the computer-readable instructions for obtaining location information further include computer-readable instructions, executable by the processor to perform the steps of passing an identification string associated with the device to a user identification server; recognizing data received from the user identification server as identification data associated with the device; passing the identification data to a location server; and recognizing data received from the location server as location information, the location information including data indicating the location of the device.

In some embodiments, the computer-readable instructions for determining if location information associated with the device can be obtained include computer-readable instructions, executable by the processor to perform the steps of examining, at the location based ratings server, device data received from a ratings server, the device data including an identification string associated with the device; and determining at the location based ratings server, based on the device data, if the device is capable of providing the requested location information.

The computer-readable medium also can include computer-readable instructions, executable by the processor to perform the step of retrieving account information associated with the device, the account information including a city and a state. In some embodiments, the computer-readable instructions for associating the location information with the ratings data further include computer-readable instructions, executable by the processor to perform the step of formatting the locations information as a data field in a database entry for the ratings data received from the device. In some embodiments, the computer-readable medium further includes computer-readable instructions, executable by the processor to perform the step of organizing two or more ratings based upon the location information associated with the ratings.

DETAILED DESCRIPTION

As required, detailed embodiments of the present disclosure are disclosed herein. It must be understood that the disclosed embodiments are merely exemplary examples of the disclosure that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

Figure 1:
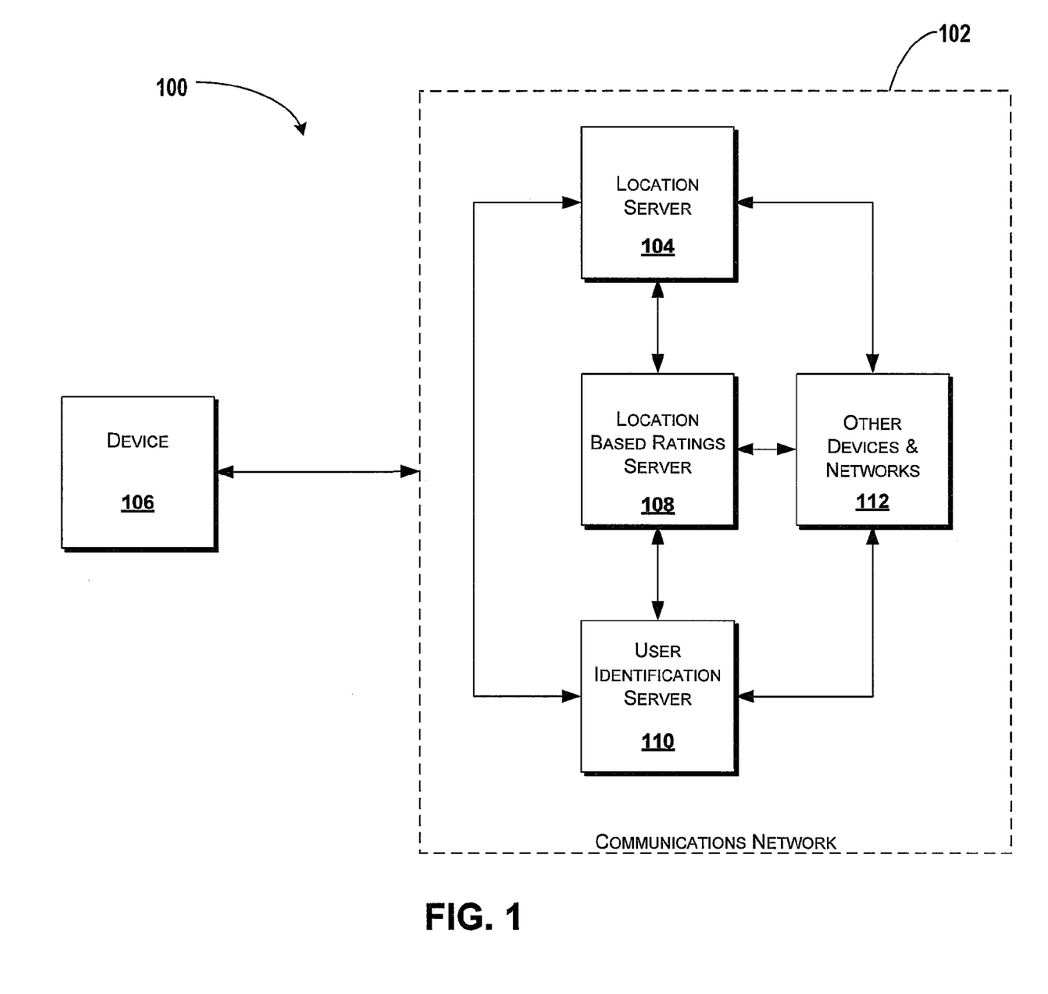
FIG. 1 schematically illustrates a system for providing location based ratings services, according to an exemplary embodiment of the present disclosure.

Referring now to the drawings in which like numerals represent like elements throughout the several views, FIG. 1 schematically illustrates a system 100 for providing location based ratings services, according to an exemplary embodiment of the present disclosure. The system 100 can include a communications network 102. The communications network 102 can include a cellular network, a packet data network, for example, the Internet (Internet), a circuit switched network, for example, a publicly switched telephone network (PSTN), other networks, combinations thereof, and the like. In some embodiments, the communications network 102 is a cellular network.

The cellular network can include various components such as, but not limited to, base transceiver stations (BTS's), Node-B's, base station controllers (BSC's), radio network controllers (RNC's), mobile switching centers (MSC's), short message service centers (SMSC's), multimedia messaging service centers (MMSC's), home location registers (HLR's), visitor location registers (VLR's), charging platforms, billing platforms, voicemail platforms, GPRS core network components, location service nodes, Internet protocol multimedia subsystem (IMS), and the like. The cellular network also can include radios and nodes for receiving and transmitting voice, data, and combinations thereof to and from radio transceivers, networks, and the Internet.

The cellular network can be configured as a 2G GSM (Global System for Mobile communications) network, and can provide data communications via GPRS (General Packet Radio Service) and EDGE (Enhanced Data rates for GSM Evolution). Additionally, the cellular network can be configured as a 3G UMTS (Universal Mobile Telecommunications System) network and can provide data communications via the HSPA (High-Speed Packet Access) protocol family, for example, HSDPA (High-Speed Downlink Packet Access), EUL (Enhanced Uplink) or otherwise termed HSUPA (High-Speed Uplink Packet Access), and HSPA+ (Evolved HSPA). The cellular network is also compatible with future mobile communications standards including, but not limited to, pre-4G and 4G, for example.

It should be appreciated that substantially all of the functionality described with reference to the communications network 102 can be performed by the cellular network alone, or in combination with other networks, network elements, and the like, and that some elements are not illustrated.

The communications network 102 also can include a location server 104. In some embodiments, the location server 104 includes one or more hardware modules and/or software modules. In some embodiments, the location server 104 determines and reports the location of a device 106 in communication with the communications network 102. In some embodiments, the device 106 determines its location, and the device 106 communicates the determined location to the location server 104. For example, the device 106 can determine its location using GPS or other location services, for example, and communicate location information to the location server 104 upon determination, at various intervals, upon occurrence of trigger events, upon requests, or the like. For example, the location server 104 can retrieve location information at the request of one or more network nodes and/or devices. By way of another example, the location server 104 can use network elements to determine the location of a device 106. In some embodiments, for example, the location server 104 uses network elements to determine location of the device 106 using triangulation of network signals, for example. As explained above, the location server 104 can be replaced, in some embodiments, with the ability for a ratings server or the LBRS 108 to host location coordinates obtained from the device 106, or another network node and/or device such as, for example, a database.

The communications network 102 also can include a location based ratings server 108 (LBRS). The LBRS 108 can use the location information received from the location server 104 to associate a location with a rating received at the LBRS 108, as will be explained in more detail below. As explained above, the device 106 can determine its location using, for example, GPS, and can provide its location to the location server 104 and/or the LBRS 108.

The communications network 102 also can include one or more user identification servers 110 (UIDS). The UIDS 110 can store user identification and account information for use by the LBRS 108 or other network nodes. In some embodiments, the UIDS 110 is a server operating on the Internet. The UIDS 110 can be accessible by the LBRS 108 and/or the device 106, as well as other devices. In some embodiments, the UIDS 110 is a memory associated with the LBRS 108, the device 106, or another device. In some embodiments, the UIDS 110 is a subscriber database and/or a data field stored in a database such as, for example, an HSS or an HLR operating on a cellular network.

The UIDS 110 can store account information, billing information, identification information, mailing addresses, home network information, roaming information, current cell ID's, SIM card data, combinations thereof, and the like. As such, the UIDS 110 can provide information used to identify a device 106 and/or a user associated with the device 106, as will be explained in more detail below. In some embodiments, the identification information can include, but is not limited to, an identification string. The identification string can include device information such as, for example, the IMSI, IMEI, a subID, an account number, SIM card information, and the like.

As illustrated, the location server 104, the LBRS 108, the device 106, and/or the UIDS 110 can be in communication with other devices and networks 112. The other devices and networks 112 can be devices and networks in communication with, or existing on, the communications network 102, and can include, for example, GPS networks, location beacons, billing modules, Internet web servers, databases, combinations thereof, and the like.

Figure 2:
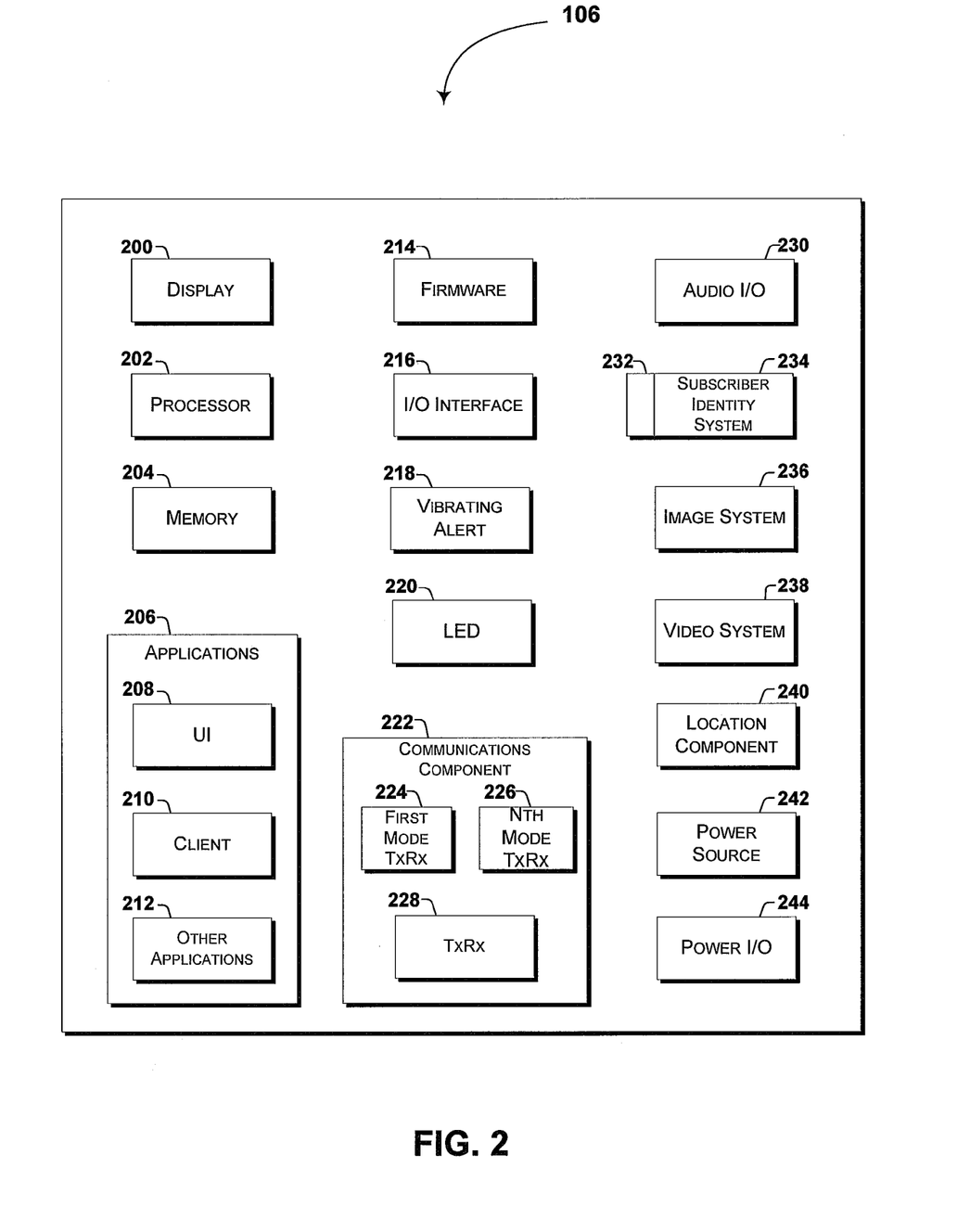
FIG. 2 schematically illustrates an exemplary device with which embodiments of the present disclosure can be implemented, according to an exemplary embodiment of the present disclosure.

FIG. 2 illustrates a schematic block diagram of an exemplary device 106 for use in accordance with exemplary embodiments of the present disclosure. Although no connections are shown between the components illustrated in FIG. 2, the components can interact with each other to carry out functions of the device 106.

It should be understood that FIG. 2 and the following description are intended to provide a brief, general description of a suitable environment in which the various aspects of some embodiments of the present disclosure can be implemented. While the description includes a general context of computer-readable instructions, the present disclosure also can be implemented in combination with other program modules and/or as a combination of hardware and software. The term "application," or variants thereof, is used expansively herein to include routines, program modules, programs, components, data structures, algorithms, and the like. Applications can be implemented on various system configurations, including single-processor or multiprocessor systems, minicomputers, mainframe computers, personal computers, handheld computing devices, microprocessor-based, programmable consumer electronics, combinations thereof, and the like.

The device 106 can be a multimode headset, and can include a variety of computer-readable media, including volatile media, non-volatile media, removable media, and non-removable media. The term "computer-readable media" and variants thereof, as used in the description and claims, can include volatile and/or non-volatile, removable and/or non-removable media such as, for example, RAM, ROM, EEPROM, flash memory or other memory technology, CD ROM, DVD, or other optical disk storage, magnetic tape, magnetic disk storage or other magnetic storage devices, or any other medium that can be used to store the desired information and that can be accessed and/or executed by the device 106.

The device 106 can include a display 200 for displaying multimedia such as, for example, text, images, video, telephony functions such as Caller ID data, setup functions, menus, music, metadata, messages, wallpaper, graphics, Internet content, advertisements, device status, preferences settings, map data, navigation data, location data, and the like. The device 106 can include a processor 202 for controlling, executing, and/or processing data. A memory 204 can interface with the processor 202, and can store data. The data stored by the memory 204 can include computer-readable instructions for execution by the processor 202. The computer-readable instructions can include, for example, applications 206.

The applications 206 can include, for example, location applications, navigation applications, web browsing software, text input software, mapping software, audio player software, video playback software, voicemail software, audio playback software, music player software, email software, messaging software, combinations thereof, and the like.

The applications 206 also can include a user interface (UI) application 208. The UI application 208 can interface with a client 210 (e.g., an operating system) to facilitate user interaction with device functionality and data, for example, browsing the Internet, inputting ratings information, answering/initiating calls, accepting/outputting navigation data, entering/deleting data, configuring settings, address book manipulation, multimode interaction, and the like. The applications 206 also can include other applications 212 such as, for example, firmware, navigation software, visual voicemail software, add-ons, plug-ins, voice processing, voice recording, messaging, e-mail processing, video processing, image processing, archival applications, music playback, combinations thereof, and the like, as well as subsystems and/or components. The applications 206 can be stored in the memory 204 and/or in a firmware 214 as executable instructions, and can be executed by the processor 202. The firmware 214 also can store code for execution during initialization of the device 106.

An input/output (I/O) interface 216 can be provided for input/output of data and/or signals. The I/O interface 216 can be a hardwire connection, such as, for example, a USB port, a mini-USB port, an audio jack, a PS2 port, an IEEE 1394 port, a serial port, a parallel port, an Ethernet (RJ48) port, a telephone (RJ11) port, and the like, and can accept other I/O devices such as, for example, keyboards, keypads, mice, interface tethers, stylus pens, printers, thumb drives, touch screens, multi-touch screens, touch pads, trackballs, joy sticks, microphones, remote control devices, monitors, displays, liquid crystal displays (LCD's), combinations thereof, and the like. It should be appreciated that the I/O interface 216 can be used for communications between the device 106 and network devices and/or local devices.

The device 106 can include a vibrating alert 218 for providing a vibration alert function for the device 106. The device 106 also can include one or more light emitting diodes 220 (LED's) for providing device status information, visual alerts, warnings, and the like.

A communications component 222 can interface with the processor 202 to facilitate wired/wireless communications with external systems including, for example, a communications network 102, one or more location servers 104, one or more LBRS's 108, UIDS's 110, VoIP networks, local area networks (LAN's), wide area networks (WAN's), metropolitan area networks (MAN's), personal area networks (PAN's), and other devices and networks 112, which can be implemented using WIFI®, WIMAX™, combinations and/or improvements thereof, and the like. The communications component 222 can be used instead of, or in addition to, the I/O interface 216.

The communications component 222 also can include a multimode communications subsystem for providing cellular communications via different cellular technologies. For example, a first cellular transceiver 224 can operate in one mode, for example, GSM, and an Nth transceiver 226 can operate in a different mode, for example UMTS. Although only two transceivers 224, 226 are illustrated, it should be appreciated that more than two transceivers can be included in the device 106. The communications component 222 also can include a transceiver 228 for unlicensed communications using technology such as, for example, WIFI®, WIMAX™, BLUETOOTH®, infrared, infrared data association (IRDA), near field communications (NFC), other radio frequency (RF) applications, and the like. The communications component 222 also can facilitate communications reception from terrestrial radio networks, digital satellite radio networks, Internet-based radio services networks, combinations thereof, and the like. The communications component 222 can process data from a network such as, for example, the Internet, a corporate intranet, GPS networks, a home broadband network, and the like, via an internet service provider (ISP), a digital subscriber line (DSL) provider, a cable provider, and/or a broadband provider. It should be appreciated that the communications component 222 can include, or can be connected to, one or more antennae through which data can be transmitted and/or received.

Audio capabilities can be provided by an audio I/O component 230 that can include, but is not limited to, speakers to output audio signals, microphones to collect audio signals, and I/O ports such as, for example, headphone/microphone jacks, to input and output audio signals. The audio I/O component 230 can include more than one speaker, including, for example, an earpiece speaker, a loudspeaker, a ringer, and the like.

The device 106 can include a slot interface 232 for accommodating a subscriber identity system 234 such as, for example, a SIM or universal SIM (USIM). The subscriber identity system 234 instead can be manufactured into the device 106, thereby obviating the need for a slot interface 232. In some embodiments, the subscriber identity system 234 can store certain features, account information, user information, rules, policies, models, and the like. The subscriber identity system 234 can be programmed by a manufacturer, a retailer, a customer, a network operator, and the like.

The device 106 can include an image capture and processing system 236 (image system). Photos and/or videos can be obtained via an associated image capture subsystem of the image system 236, for example, a camera. The device 106 also can include a video system 238 for capturing and recording video content. The video system 238 can provide video data to various applications 206, such as, for example, video teleconferencing applications, video compression applications, video messaging applications, video sharing applications, and the like.

A location component 240 can be included to send and/or receive signals such as, for example, GPS data, A-GPS data, WIFI®, WIMAX™, cellular network triangulation data, and/or combinations thereof, and the like. The location component 240 can receive and/or transmit signals via one or more antennae. The location component 240 can interface with cellular network nodes, telephone lines, satellites, location transmitters and/or beacons, wireless network transmitters and receivers, for example, WIFI® hotspots, radio transmitters, combinations thereof, and the like. The device 106 can obtain, generate, and/or receive data to identify its location, or can transmit data used by other devices to determine the device 106 location. The device 106 can include a power source 242 such as batteries and/or other power subsystems (AC or DC). The power source 242 can interface with an external power system or charging equipment via a power I/O component 244.

Figure 3:
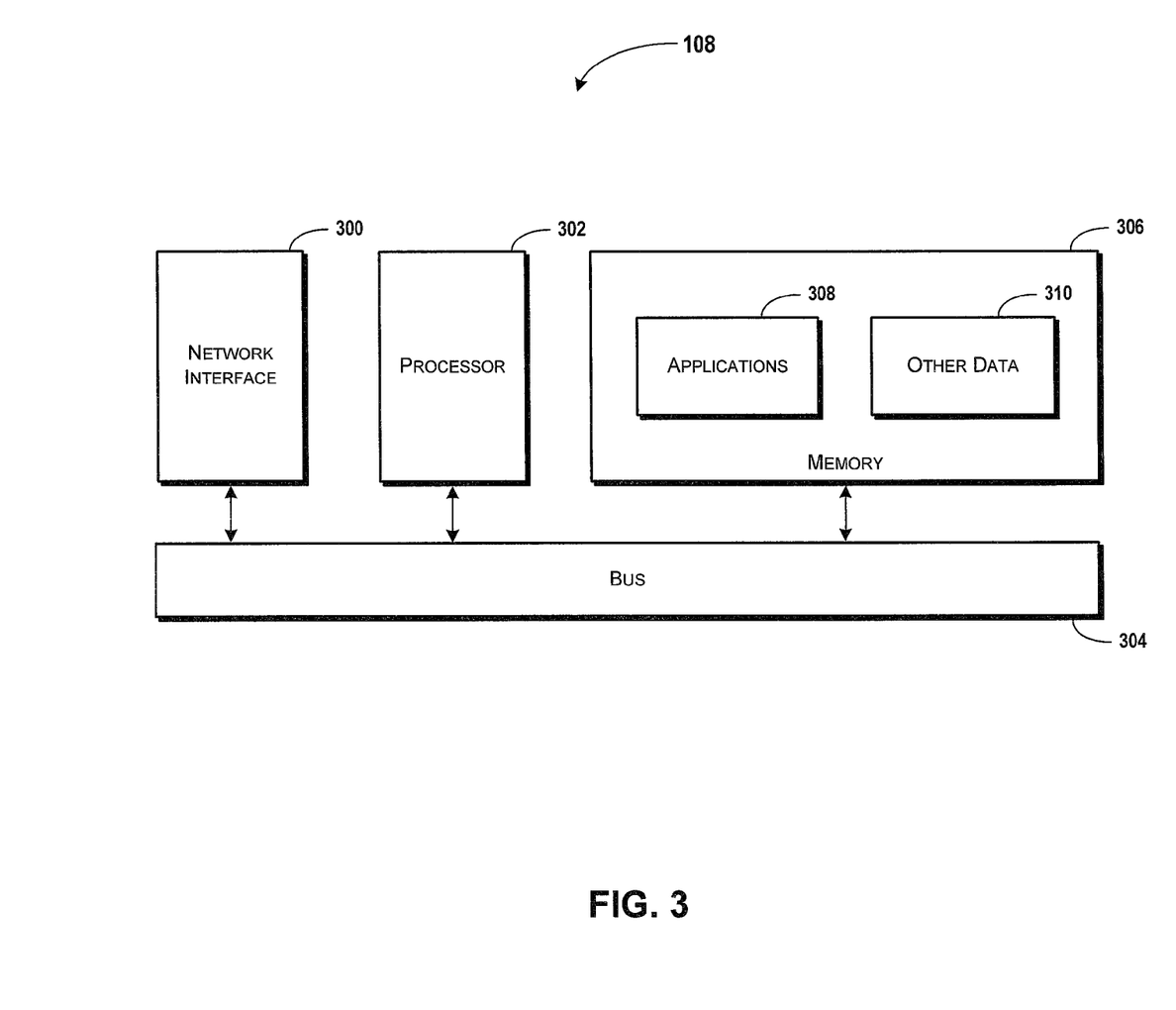
FIG. 3 schematically illustrates a location based ratings server, according to an exemplary embodiment of the present disclosure.

FIG. 3 schematically illustrates a block diagram of the LBRS 108, according to an exemplary embodiment of the present disclosure. The LBRS 108 can be a combination of hardware and software, and can exist as a node upon, or in communication with, the communications network 102, as explained above with reference to FIG. 1. It should be appreciated that the functionality of the LBRS 108 can be included as a software module executed by a hardware module associated with the communications network 102. As such, while the LBRS 108 is described as a hardware device with associated software, it should be appreciated that the software and hardware devices can be remote from each other. The LBRS 108 is illustrated and described as a unitary device for ease and clarity of description, and not to limit the scope of the disclosure.

As illustrated in FIG. 1, The LBRS 108 can be in communication with one or more networks and/or devices such as, for example, the communications network 102, the location server 104, the device 106, the UIDS 110, the other devices and networks 112, combinations thereof, and the like, via one or more network interfaces 300. In some embodiments, the functions of the location server 104, the LBRS 108, and the UIDS 110 can be performed by a single device and/or a single software module executed by one or more hardware modules. The location server 104, the LBRS 108, and the UIDS 110 are illustrated and described herein as three distinct and separate devices to clarify the description thereof.

The network interfaces 300 can be operatively linked and in communication with one or more processors 302 via one or more data/memory busses 304. The processor 302 can be operatively linked and in communication with one or more memory devices 306 via the data/memory bus 304. The processor 302 can execute computer-readable instructions, for example, computer-readable instructions stored in the memory 306, to perform various functions. Execution of the computer-readable instructions can cause the LBRS 108 to perform various functions, for example, the functionality of the LBRS 108 described below.

The word "memory," as used herein to describe the memory 306, collectively includes all memory types associated with the LBRS 108 such as, but not limited to, processor registers, processor cache, random access memory (RAM), other volatile memory forms, and non-volatile, semi-permanent or permanent memory types; for example, tape-based media, optical media, flash media, hard disks, combinations thereof, and the like. While the memory 306 is illustrated as residing proximate the processor 302, it should be understood that the memory 306 can be a remotely accessed storage system, for example, a server and/or database on the communications network 102, a remote hard disk drive, a removable storage medium, combinations thereof, and the like. Moreover, the memory 306 is intended to encompass network memory and/or other storage devices in wired or wireless communication with the LBRS 108, which may utilize the network interface 300 to facilitate such communication. Thus, any of the data, applications, and/or software described below can be stored within the memory 306 and/or accessed via network connections to other data processing systems (not shown) that may include a local area network (LAN), a metropolitan area network (MAN), or a wide area network (WAN), for example.

Accordingly, concepts of the present disclosure may operate on the LBRS 108, wherein the LBRS 108 is configured as a server to one or more client data processing systems as dictated by a client/server model. In some embodiments, for example, the LBRS 108 serves data to a web server such as, for example, a ratings server operating on the Internet. In some embodiments, the LBRS 108 operates as a software module for execution by a hardware module residing on a ratings server. The illustrated memory 306 can include one or more applications 308 and/or other data 310.

The applications 308 can include various programs, routines, subroutines, algorithms, software, tools, and the like ("instructions"), for providing location based ratings services. The applications 308 can be executed by the LBRS 108 to recognize data received as location information, ratings information, a request for location information, a request for ratings information, combinations thereof, and the like. The data, and/or requests for the data, can be received from the device 106, the location server 104, a ratings server, or another device or network node, and can be received directly, or via another network node. The applications 308 also can include instructions for evaluating generated data, received data, and/or received data requests, and for sending data to one or more elements of the communications network 102. These and other functions of the LBRS 108 will be described in more detail below.

The applications 308 also can include instructions used to operate the LBRS 108 and/or devices connected to the LBRS 108, if any. The instructions can include, for example, operating systems, firmware, drivers for peripherals, and the like. The applications 308 also can include, for example, authentication software, billing applications, charging applications, monitoring applications, usage tracking applications, and the like.

The other data 310 can include, for example, billing information, roaming partner lists, charging applications, account data, user device data, software, programs, algorithms, hardware data, network utilization data, and the like. The other data 310 also can include account/device data that relates to a user's account and/or to one or more devices 106. The account/device data can include, but is not limited to, data indicating users' subscription plans, users' subscription features, users' preferences, capabilities of users' devices 106, combinations thereof, and the like.

The LBRS 108 can be in communication with one or more charging platforms and/or other network nodes, to send and/or receive the account/device data relating to a user's subscription plan, usage, and charging and/or billing information. The LBRS 108 can analyze the account/device data to determine what features and services the user's device 106 supports by examining data relating to the device 106, for example, one or more of the IMSI or the IMEI, the serial number, a carrier, a software version(s), firmware information, one or more carrier-specific applications, combinations thereof, and the like. Additionally, the LBRS 108 can analyze the account/device data to determine what features and services the user is entitled to request and/or use. For example, the account device data can indicate if the device 106 supports WIFI®, 3G, 2G, EDGE, GPS, A-GPS, location based services, short message service (SMS) messaging, email messaging, data transfer services, network triangulation, BLUETOOTH®, NFC, audible navigation instructions, web formats, audio formats, video formats, data transfer of audio files and video files, and the like. Additionally, the account/device data can indicate whether services for the device 106 are charged/billed on a pre-paid and/or post-paid basis, or if features are available on the device 106.

The account/device data can pass-through the LBRS 108, or can be stored, at least temporarily, by the LBRS 108. Additionally, billing, privacy, safety, and/or other concerns can be used to tailor functionality of the LBRS 108 through the account/device data. For example, a user can disable the functionality of the LBRS 108 and store a preference indicating disablement of the LBRS 108 as an account setting stored in the account/device data. Additionally, the LBRS 108 can use billing information to adjust functionality of the LBRS 108. For example, a notification can be sent from a billing platform to the LBRS 108 and the LBRS 108 can disable and/or enable functionality, place limits on usage amounts, and the like, automatically. A user can be given the ability to override deactivation of some, none, or all desired features and/or functionality of the LBRS 108.

The other data 310 also can include a charging module (not illustrated) that can be used to track, collect, and/or report activities of the LBRS 108 to a charging and/or billing system at the LBRS 108, or elsewhere on the communications network 102 for charging and/or billing purposes. The charging module can track, for example, how much data is sent and received by the LBRS 108, and can report this information to a charging and/or billing system of the communications network 102, for example. Charging and/or billing can be pre-paid or post-paid. The functionality of the LBRS 108 can be charged on any desired basis, including, but not limited to, a per-use basis, as a flat fee, as part of service package, or the like.

Although not illustrated in FIG. 3, the applications 308 also can include verification modules. The verification modules can review and/or analyze, for example, requests for location information, location information, and/or identification information, and the like. The verification modules can perform various analyses on the information and/or information requests. For example, the verification modules can determine if information requests come from authorized requesters, if the information is likely being requested for a legitimate purpose, if the requested information is available, if the requested information should be provided, and the like. These and other functions will be described in more detail below.

Figure 4:
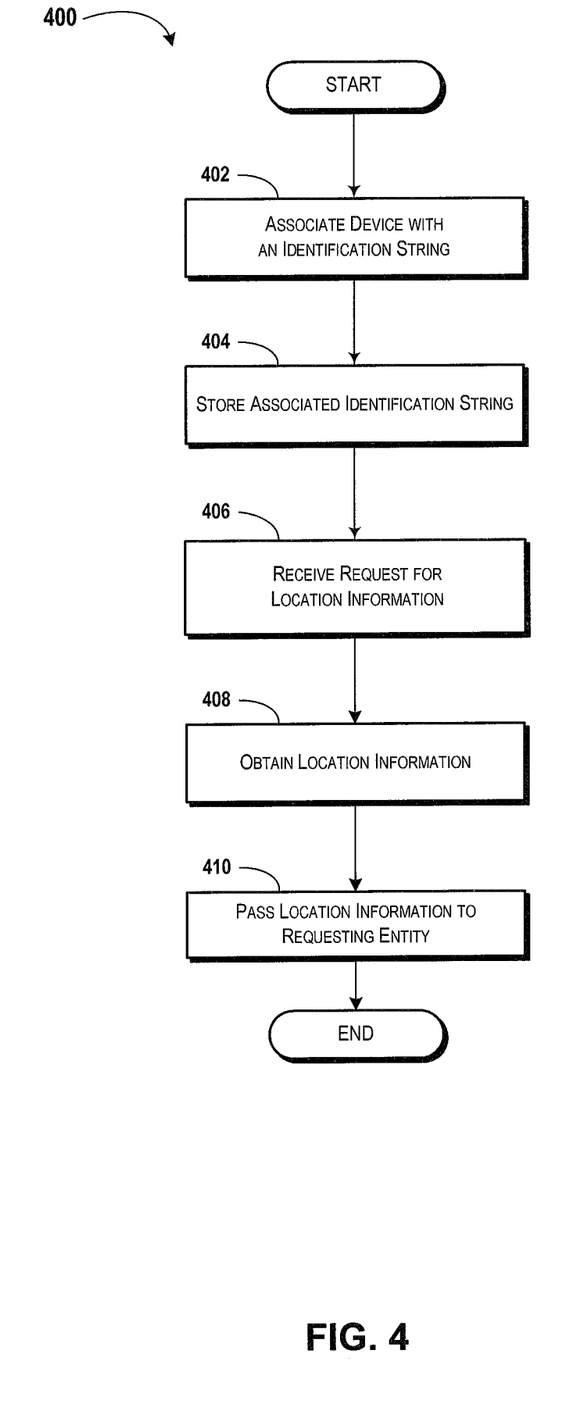
FIG. 4 schematically illustrates a method for generating and providing location information to a communications network, according to an exemplary embodiment of the present disclosure.

FIG. 4 schematically illustrates a method 400 for generating and providing location information to a communications network 102, according to an exemplary embodiment of the present disclosure. It should be understood that the steps of the method 400 are not necessarily presented in any particular order and that performance of some or all the steps in an alternative order(s) is possible and is contemplated. The steps have been presented in the demonstrated order for ease of description and illustration. Steps can be added, omitted and/or performed simultaneously, without departing from the scope of the appended claims. It should also be understood that the illustrated method 400 can be ended at any time.

Some or all steps of the method 400, and/or substantially equivalent steps, can be performed by execution of computer-readable instructions included on a computer-readable medium. The term "computer-readable medium" and variants thereof, as used in the description and claims, can include volatile and/or non-volatile, removable and/or non-removable media such as, for example, RAM, ROM, EEPROM, flash memory or other memory technology, CD ROM, DVD, or other optical disk storage, magnetic tape, magnetic disk storage or other magnetic storage devices, or other media that can be used to store the computer-readable instructions.

The method 400 begins, and flow proceeds to block 402, wherein an identification string is associated with the device 106, an account associated with the device 106, and/or user associated with the device 106. It should be appreciated that the identification string can be associated with the device 106 at some time, for example, during provisioning of communications services for the device 106, during account creation, during registration with and/or attachment to the communications network 102, an identification string such as, for example, a subID. The identification string can be created and/or assigned to the device 106 and/or a user associated with the device 106. A network device, for example, the UIDS 110, the LBRS 108, and/or another device, can store the identification string and association information that indicates what device 106, user, and/or account is associated with the identification string, as illustrated at block 404.

At some time, as illustrated at block 406, the communications network 102, or a node thereof, for example, the LBRS 108, can receive a request for location information. The LBRS 108 can receive a request for location information from a ratings server, from an application, and/or from another network application or device. In some embodiments, the LBRS 108 functions as a ratings server and can generate a request, for example, via a programming code function call, for location information. The request for location information can indicate the identity of the device 106 for which location information is requested. In some embodiments, for example, a request for location information includes an identification string associated with the device 106 for which location information is requested.

Although not illustrated in FIG. 4, the LBRS 108 can determine if the requesting entity is entitled to receive the location information. For example, in some embodiments, the LBRS 108 analyzes location information requests to determine if the requests are received from authorized entities, requested for authorized uses, and the like. As such, the LBRS 108, or other network entities can include fraud protection software and/or hardware modules including, but not limited to, firewalls, anti-virus applications, anti-phishing applications, SPAM protection, request analysis applications, combinations thereof, and the like. In some embodiments, the LBRS 108 can require authentication by devices and/or users requesting location information. Anti-fraud software, hardware, and methods will not be described herein in detail.

As illustrated at block 408, the LBRS 108 can obtain location information for the device 106 associated with the received identification string. The phrase "location information," as used in the specification and the claims, is used broadly to collectively refer to many contemplated types of location information. In some embodiments, the location information includes network information relating to the device requesting location information and/or submitting ratings data. For example, the communications network 102 can retrieve account and/or device information relating to a device 106 used to submit data to a ratings server. The account and/or device information can include a cell ID of a cellular network tower connected to the user's device 106 at the time the rating is submitted, location information associated with the device when the rating is submitted, home network information, for example, the city and state of the user's home network, a billing address associated with an account associated with a retrieved identification string, and the like, a home address associated with the account, a business address associated with the account, combinations thereof, and the like.

Similarly, the communications network 102 can determine if the device 106 is or was roaming when the rating is/was submitted to the LBRS 108. As such, the LBRS 108 can determine if the user submitting the rating is local, with respect to the business the user is rating. In some embodiments, the LBRS 108 uses various network-based technologies and/or device-based technologies to determine the actual physical location of the device 106. For example, the LBRS 108 can request location information from the device 106 or a location server 104, and the device 106 or the location server 104 can determine the location of the device 106 using, for example, a location component 240 of the device 106, network elements located at, or in communication with, the communications network 102, combinations thereof, and the like. As such, the LBRS 108 can obtain and store information indicating the location of the party rating the business entity.

As illustrated at block 410, the LBRS 108 can pass the location information to the requesting entity, a network node, a software module, a database, or another hardware and/or software module. In some embodiments, the LBRS 108 uses the location information, as explained above. As such, the LBRS 108 can pass the information to a program, application, function, or the like, for use in generating location based ratings. The method 400 can end.

Figure 5:
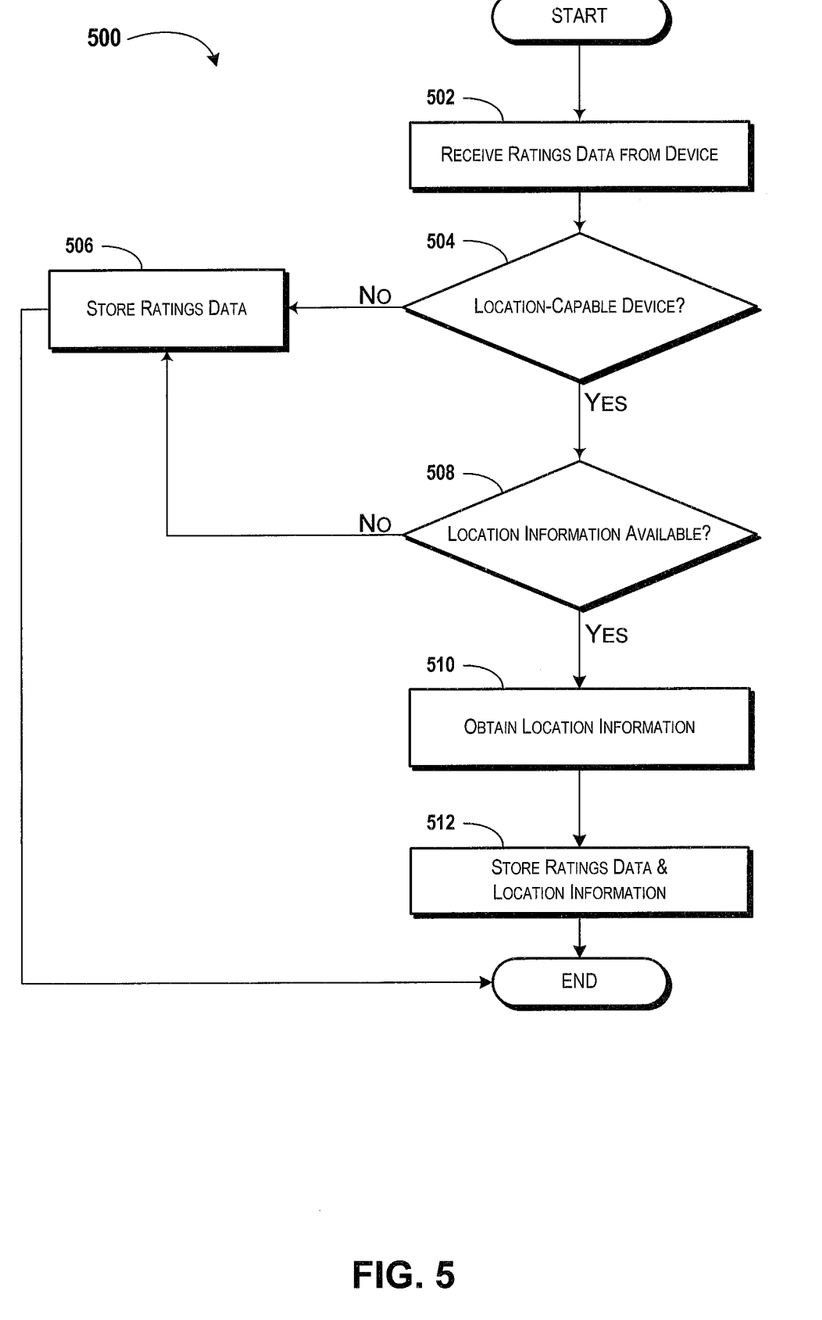
FIG. 5 schematically illustrates a method for generating a location based rating on a communications network, according to an exemplary embodiment of the present disclosure.

FIG. 5 schematically illustrates a method 500 for generating a location based rating on a communications network 102, according to an exemplary embodiment of the present disclosure. It should be understood that the steps of the method 500 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 500 can be ended at any time.

Some or all steps of the method 500, and/or substantially equivalent steps, can be performed by execution of computer-readable instructions included on a computer-readable medium. The term "computer-readable medium" and variants thereof, as used in the description and claims, can include volatile and/or non-volatile, removable and/or non-removable media such as, for example, RAM, ROM, EEPROM, flash memory or other memory technology, CD ROM, DVD, or other optical disk storage, magnetic tape, magnetic disk storage or other magnetic storage devices, or other media that can be used to store the computer-readable instructions.

The method 500 begins, and flow proceeds to block 502, wherein a network node, for example, ratings server, and/or the LBRS 108, receives ratings data from a device, for example, the device 106, a ratings server, or another network node or device. In some embodiments, the LBRS 108 functions as a ratings server. For example, the LBRS 108 can be a server on the Internet, a cellular network, or elsewhere on the communications network 102. In other contemplated embodiments, the LBRS 108 is a software module that is executed by a server on the Internet, a cellular network, or elsewhere on the communications network 102. As such, the LBRS 108 can receive the ratings data directly, or the ratings data can be routed to the LBRS 108 from or through other network devices.

In some embodiments, the LBRS 108 receives ratings data as a request, from a ratings server, for location information. The ratings server can operate on the Internet, or elsewhere on the communications network 102, and can be in communication with the LBRS 108. The ratings server also can function as a server for hosting Internet content, for example. The ratings server can determine what kind of device is connected to the ratings server. In some embodiments, the ratings server can retrieve device data during, before, or after loading of the Internet content by the device connected to the ratings server. The device data can include, for example, browser information, operating system information, IP addresses, and the like. Additionally, or alternatively, the device data can include an identification string associated with the connected device, as explained above with reference to FIG. 1.

As illustrated at block 504, the LBRS 108 can examine the device data to determine if the connected device is an LBRS-compatible device. In some embodiments, the LBRS 108 determines that the device 106 is an LBRS 108 compatible device based upon the identification string, the browser software, an operating system version, or other data. In some embodiments, the ratings server passes the device data to another network node to determine if the device 106 is an LBRS-compatible device. For example, if the LBRS 108 is configured to request location directly from the device 106, the LBRS 108 can determine that the device 106 is not capable of determining a current location. Similarly, the LBRS 108 can determine that the device 106 is currently unable to determine its location for other reasons.

If the LBRS 108 determines that the connected device is not an LBRS-compatible device, the LBRS 108, the ratings server, or another ratings system on the communications network 102, can provide ratings services without location, if desired, as illustrated at optional block 506. The method 500 can end. If the LBRS 108 determines that the connected device is an LBRS-compatible device, the LBRS 108 can determine if location information for the device is available, as illustrated at block 508. As explained above, the phrase "location information" is used to broadly refer to various types of location information.

If the LBRS 108 determines that location information is not available for the connected device, the LBRS 108, the ratings server, or another ratings system on the communications network 102, can provide ratings services without location, if desired, as illustrated at block 506. The method 500 can end. If the LBRS 108 determines that location information is available for the connected device, the LBRS 108 can obtain location information for the connected device, as illustrated at block 510, as explained above. It should be appreciated that obtaining location information can include generating and sending a request to another node and/or device, and/or can prompt the steps illustrated in blocks 406-410 of FIG. 4.

As illustrated at block 512, the LBRS 108 can associate and store ratings data and location information to create a location based rating. The location information can be formatted into any desired format including, but not limited to, a city and state, coordinates, street addresses, combinations thereof, and the like. The raw and/or formatted location information can be stored with the ratings, for example, as a data field in a database that stores ratings. The method 500 can end.

Figure 6:
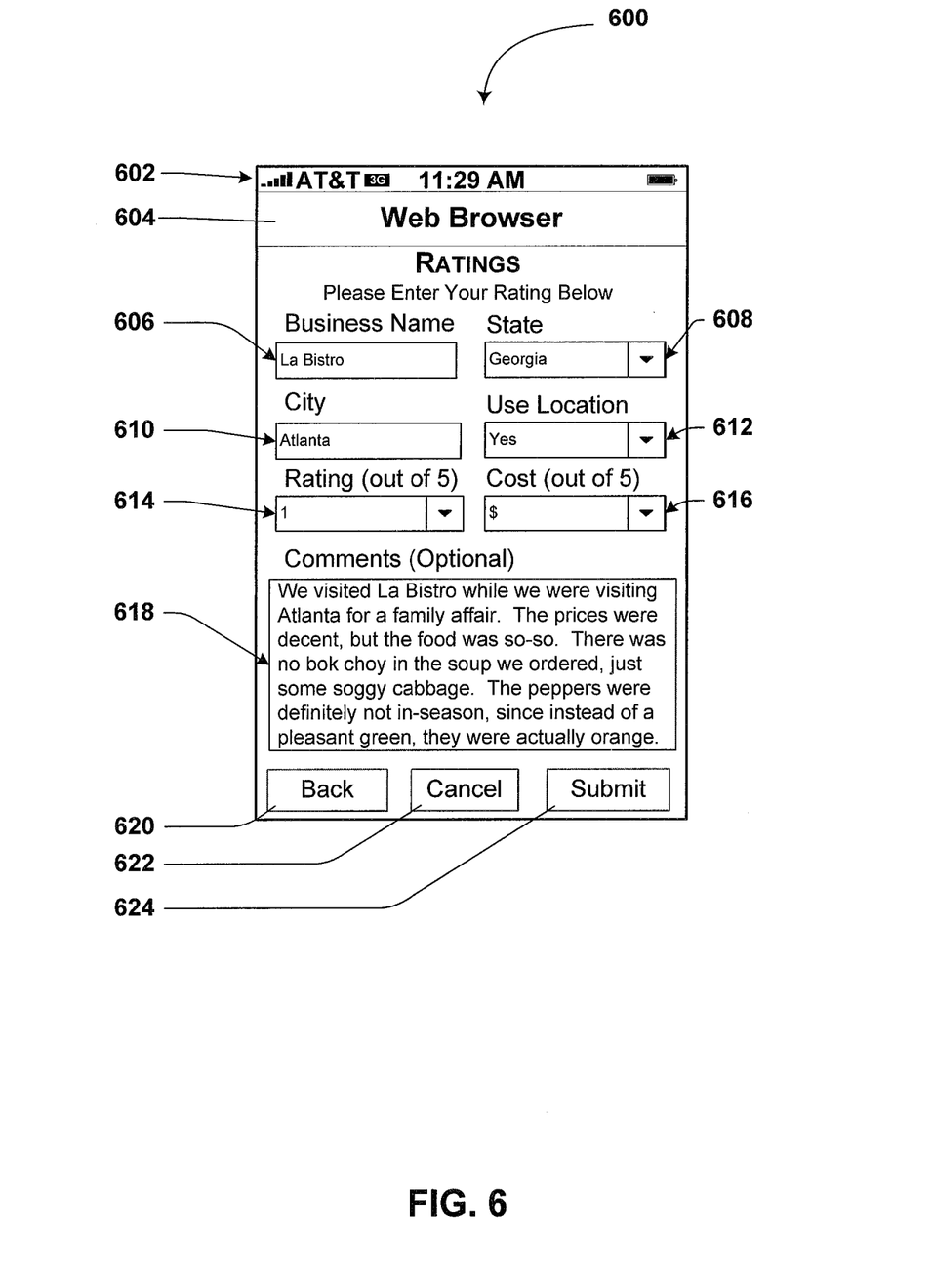
FIG. 6 illustrates a graphical user interface (GUI) for interfacing with a location based ratings system, according to an exemplary embodiment of the present disclosure.

FIG. 6 illustrates an exemplary graphical user interface 600 (GUI) for a device 106, according to an exemplary embodiment of the present disclosure. The GUI 600 can be used to allow a user to interface with a communications network 102 to generate location based ratings. In some embodiments, the GUI 600 is displayed by a video output source on a display 200 of a device 106.

As illustrated, the GUI 600 can include operational information 602 for the device 106. The operational information 602 can include network information, for example, a signal meter for displaying the measured strength of a network signal, and information relating to the network with which the device 106 is in communication. In the illustrated GUI 600, the device 106 is indicating maximum signal strength and that the device 106 is currently connected to the AT&T third generation (3G) network. This indication is exemplary only, and the GUI 600 can be used on devices operating on other networks, other protocols, other standards, and/or operated by other carriers. The operational information 602 also can include, for example, the time of day, GPS satellite information, a date, a message waiting indicator, a battery meter, a short range radio communications device indicator, an alarm indicator, other information, and the like.

The GUI 600 can include a title portion 604 for indicating to a user the function currently being performed by the device 106. The GUI 600 also can include a ratings form for entering ratings data at the device 106. The ratings form can be, for example, a web-based form viewed via a web browser operating at the device 106. As such, the ratings form can be coded in a number of languages and/or scripts, including, but not limited to, JAVA, PERL, CGI, C++, HTML, XML, SHTML, XHTML, combinations thereof, and the like. The form also can be generated by a location based ratings application running at the device 106 or at another entity. In some embodiments, for example, a location based ratings application runs at the device 106, collects data from a user of the device 106, and communicates with one or more nodes of the communications network 102 to pass the data to the communications network 102. It should be appreciated that the data entered at the device 106 can be communicated to the LBRS 108, or another network device such as, for example, a ratings server, a ratings database, or another device and/or node.

The illustrated ratings form includes a business name field 606 for entering and/or displaying the business name of the entity for which ratings data is being entered. The ratings form also can include a state field 608 and a city field 610 for entering the city and state of the business for which ratings data is being entered. The business name field 606, the state field 608, and/or the city field 610 can be populated automatically by a ratings server, the LBRS 108, or another entity, if desired. For example, in some embodiments, the user navigates through the ratings site to find a page associated with the business for which the user wishes to submit a rating. The user can choose an option to submit a rating, and the information relating to the business for which the user wishes to submit a rating can be automatically loaded into the business name field 606, the state field 608, and/or the city field 610, and/or alternative and additional fields (not illustrated).

The ratings form also can include an option 612 to use location information associated with the user. In some embodiments, the option to use the user's location information informs the ratings server that the user is willing to share location information with the ratings server. As explained above, the phrase "location information" is used herein to broadly refer to several types of location information. In some embodiments, the location information is automatically provided, without requiring a user to specify the option. For example, a location based ratings application can, by default, submit location information without the user's permission. Various preferences and/or options can tailor functionality of applications and/or hardware of the device 106, if desired.

The ratings form also can include a rating field 614 to enter an overall rating for the goods and/or services offered by the business. The ratings form can include a cost field 616 to enter an overall cost rating for the goods and/or services provided by the business. The ratings form also can include a comments field 618 in which a user can enter any comments, if desired.

The GUI 600 also can include various options, for example, an option 620 to go back, for example, to a previous screen, application, field, or the like, an option 622 to cancel submission of the ratings, an option 624 to submit the ratings form to the LBRS 108, the ratings server, or another network node, an option (not illustrated) to exit the ratings application, additional and/or alternative options (not illustrated), combinations thereof, and the like.

Figure 7:
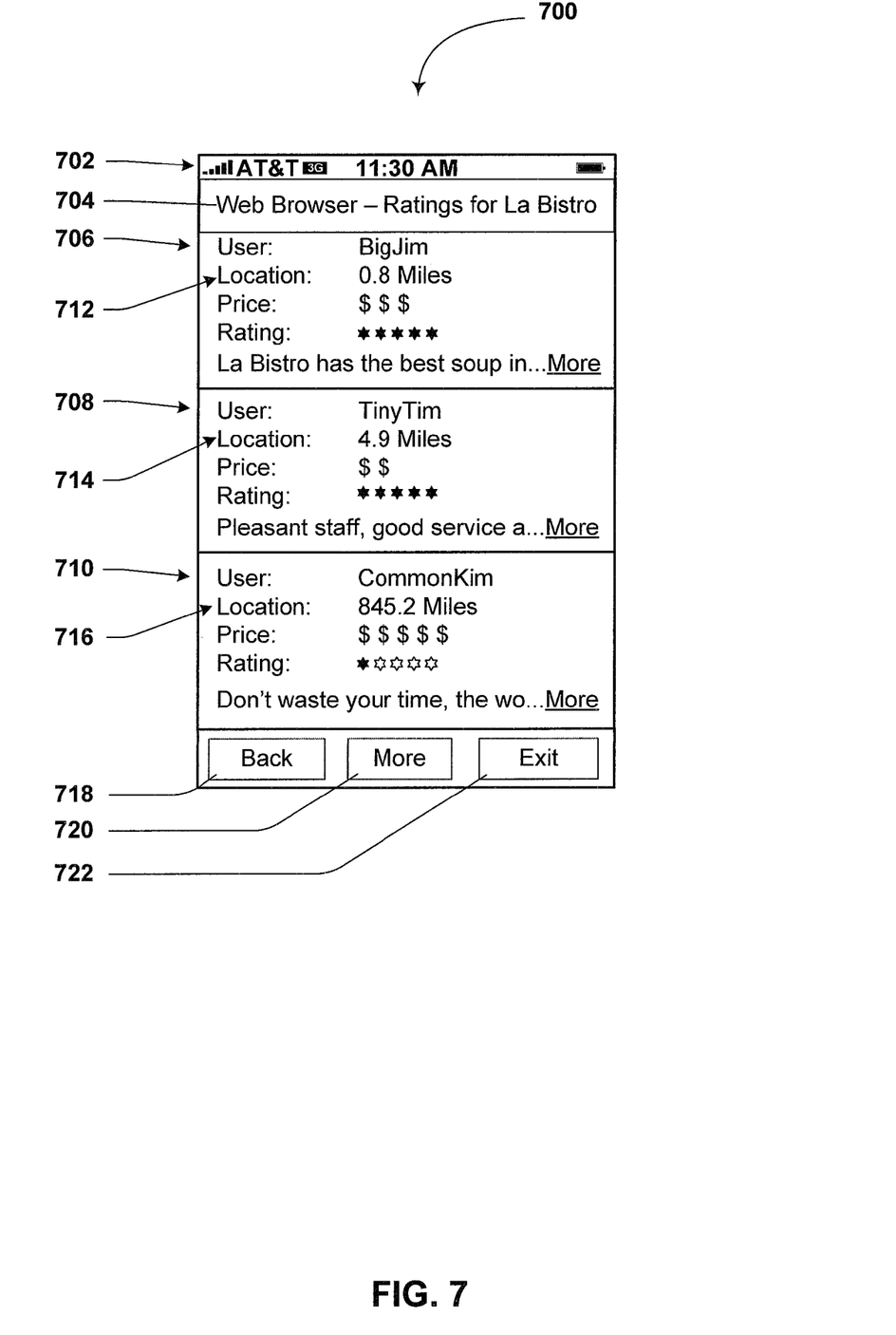
FIG. 7 illustrates a GUI for viewing location based ratings, according to an exemplary embodiment of the present disclosure.

FIG. 7 illustrates a GUI 700 for viewing location based ratings, according to another exemplary embodiment of the disclosure. It should be appreciated that the information illustrated in FIG. 7 can be displayed on a display of a computer, a laptop, a smart phone, a web browser interface, and/or other devices. In some embodiments, the GUI 700 is displayed by a video output source on a display 200 of the device 106. The GUI 700 is displaying location based ratings for a business selected by a user, for example, via another GUI (not illustrated).

As illustrated, the GUI 700 can include operational information 702 for the device 106, as described above with reference to FIG. 6. The GUI 700 can include a title portion 704 for indicating to a user the function currently being performed by the device 106. In the illustrated embodiment, the title portion 704 informs the user that the GUI 700 is currently displaying location based ratings for a business titled "La Bistro." This indication is exemplary only.

The illustrated GUI 700 includes ratings 706, 708, 710. The ratings can include various data entered by users, systems, devices, network operators, and the like. In the illustrated GUI 700, the ratings 706, 708, 710 include a user name, i.e., the name of the person who submitted the rating. The ratings 706, 708, 710 also can include an overall price rating, an overall rating, remarks, links to more remarks, and other information (not illustrated). The ratings 706, 708, 710 also can include location data 712, 714, 716 associated with the user who submitted the rating, as explained above.

The GUI 700 can include various options, for example, an option 718 to go to previously viewed/retrieved Internet content, a previous screen, a previous application, an option 720 to view more reviews, an option 722 to exit the ratings application, additional and/or alternative options (not illustrated), combinations thereof, and the like. It should be understood that the illustrated options 718, 720, 722 are exemplary only. Additional and/or alternative options are possible and contemplated.

Including location information in ratings can give users the ability to subjectively determine the reliability of the rating information based upon personal or established criteria, if desired. A user can determine that a restaurant rating submitted by someone whose location information indicates a billing or home address that is not near the rated business could be deemed less reliable than a rating from a local user. For example, a rating with an associated address that is over 100 miles away could be deemed by a user as less reliable than a ratings submitted by a user with associated location information within 10 miles of the rated business. It can be determined, for example, that a user from over 100 miles, or another distance, away may have different tastes than a local user, may have had a bad experience at a single visit, may have received substandard service due to his or her origin, and/or the like. As such, a user can take into account these and other considerations while reviewing location based ratings.

Of course, users of the location based ratings services can base decisions on other rules, assumptions, preferences, and the like. For example, with reference to the three exemplary ratings 706, 708, 710 of FIG. 7, a user may notice that the top two ratings 706, 708 are indicated as being submitted by users with local location information 712, 714. The bottom rating 710 has location information 716 indicating a large distance between the user's associated location and the rated business. In the illustrated example, the bottom rating 710 is very dissimilar to the top two ratings 706, 708. For example, the local users of the top two ratings 706, 708 gave five stars out of five overall, and rated the cost as two and three dollar signs out of five. Meanwhile, the remote user of the bottom rating 710 gave an overall rating of one star out of five, and rated the cost as five dollar signs out of five. In other words, the top two ratings 706, 708 indicate a business that is rated excellent overall, and average with respect to price. The bottom rating 710 indicates a business that is rated poor overall, and high with respect to price. A user of the location based ratings service may disregard the bottom rating 710 and assume that the rating was poor based upon the rating user's location information 716.

It should be appreciated that a user of the location based ratings service may give more weight to ratings submitted by remote users than ratings submitted by local users, for various reasons. The example provided above is exemplary only, and is provided merely to clarify certain aspects of the present disclosure.

Figure 8:
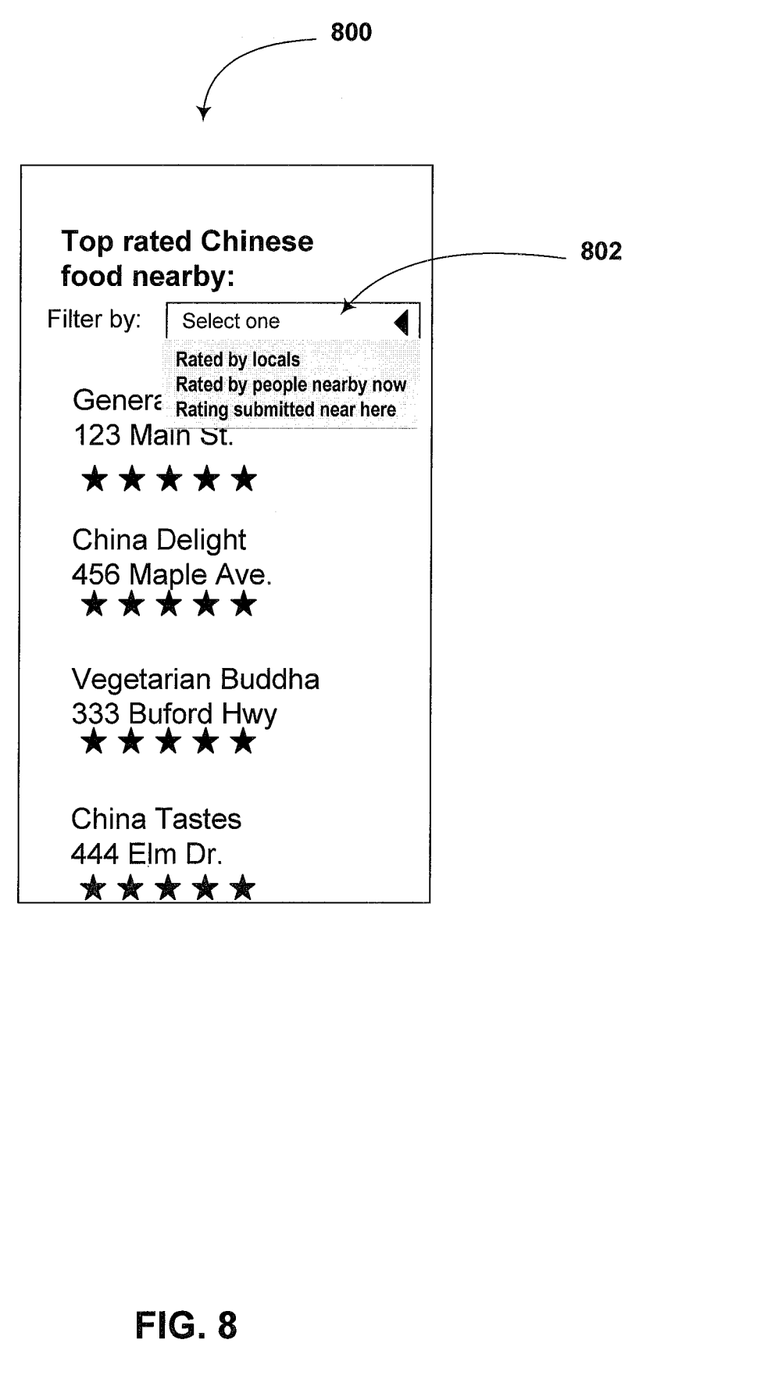
FIG. 8 illustrates another GUI for viewing location based ratings information, according to another embodiment of the present disclosure.

Referring now to FIG. 8, another GUI 800 is illustrated, according to an exemplary embodiment of the present disclosure. It should be appreciated that the information illustrated in FIG. 8 can be displayed on a display of a computer, a laptop, a smart phone, a web browser interface, and/or other devices. In some embodiments, the GUI 800 is displayed by a video output source on a display 200 of a device such as, for example, the device 106. The GUI 800 is displaying location based ratings for a category of businesses selected by a user, for example, via another GUI (not illustrated). Another embodiment of the present disclosure will be explained with reference to FIG. 8, though the concepts discussed can be combined with other concepts discussed above.

As shown in FIG. 8, the GUI 800 includes an option 802 to filter ratings based upon location. A user can filter ratings for a business, or businesses, based upon the location of the users who submitted the ratings, as explained in detail above. As illustrated in FIG. 8, the user can browse a category of businesses, a single business, business within a designated location, and the like. The option 802 includes several location-based filtering options such as filtering by businesses rated by users whose account information is local to the business rated. For example, a "local" can be defined as a user who lives, works, or has a billing address within a designated distance of a rated business. In some embodiments, the designated distance is 5 miles or less. In some embodiments, the designated distance is 25 miles or less. The designated distance can be set up and/or configured by a user, a network operator, and/or another authorized entity. In some embodiments, the designated distance is defined as including the entire metropolitan area in which the restaurant is located.

The option 802 also can include an option to filter ratings by looking for users who submitted ratings who are now located near the user retrieving ratings. This option can be helpful when, for example, a user is at a gathering of like-minded individuals, for example, a marketing conference, a seminar, a convention, or the like. A user searching for ratings, can filter ratings results by finding users nearby at a current time.

The current location of the user searching for ratings can be determined, for example, by querying the device 106 and/or network elements to obtain a location of the device 106, as has been explained above in detail. The location of rating users can then be determined, and ratings submitted by users currently located nearby can be prioritized. Again, "near" and "nearby" can be defined in objective terms such as, for example, 100 feet, 100 meters, 1/10 of a mile, 1 mile, within the same building, the same city and/or state, and the like. It should be appreciated that searching ratings by finding rating users who are now "near" the user searching for ratings can be accomplished without associating location information with a rating when the rating is submitted. For example, in some embodiments, the user selects the option to find ratings by users who are not nearby, and a query of the ratings is generated. User ratings are analyzed, and the LBRS 108 can be queried for each rating to determine the location information associated with each rating. An identification string, which can be stored with each rating, can be passed to the LBRS 108, or another device that can perform substantially the same functions, and the location information for each rating can be determined. When a rating is found that includes location information that is "near" the current location of a user searching for ratings, the rating can be passed to the user searching for ratings, or an indication can be included in a rating presented to the user. As such, a user can find ratings submitted by like-minded individuals using concepts of the present disclosure.

Additionally, as explained above, the option 802 can include an option to filter ratings by finding ratings that were submitted near the current location of a user searching for ratings. The user's current location can be determined, as explained above, and location information can be determined for each rating, as explained above. The ratings can then be sorted, filtered, prioritized, or otherwise ordered, based upon the determined location information. In some embodiments, the ratings are ordered based upon the location the rating was submitted, and the rating submitted the closest to the user's current location can be placed first.

As such, it can be appreciated that concepts of the current disclosure allow users to organize ratings based upon various criteria related to location. These criteria can be selected, stored as a preference, or can be part of an application and/or user interface for a system providing location based ratings services.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:
1. A system, for providing location-based ratings services to a device using a communications network, comprising:
a location-based ratings server comprising a memory having computer-readable instructions that, when executed by a processor of the location-based ratings server, causes the processor to perform operations comprising:

recognizing received data as ratings data submitted by the device;
determining if location information associated with the device can be obtained, the determining comprising:
receiving device data;
examining the device data received;
determining, based on the device data, whether the device is location-based-ratings-server compatible; and
determining, if the device is determined to be location-based-ratings-server compatible, that the location information can be obtained;
obtaining, if it is determined that the location information associated with the device can be obtained, the location information associated with the device, wherein obtaining the location information associated with the device comprises:
passing an identification string associated with the device to a user identification server, the user identification server comprising a home location register of the communications network;
recognizing received data as identification data associated with the device;
passing the identification data to a location server; and
recognizing received data as the location information associated with the device;
associating the location information to the ratings data; and
storing the ratings data and the location information in a storage medium associated with the system.

2. The system of claim 1, wherein the operations further comprise recognizing received data as a request for location information.

3. The system of claim 1, wherein the operations further comprise retrieving account information being associated with the device and indicating a city and a state.

4. The system of claim 1, wherein the operation of associating the location information to the ratings data comprises formatting the location information as a data field in a database entry for the ratings data received from the device.

5. The system of claim 4, wherein the operations further comprise organizing two or more ratings based upon the location information associated with the ratings.

6. A method, associated with providing location-based ratings services to a device using a communications network, comprising:
recognizing, by a tangible location-based ratings server, data as ratings data submitted by the device;
determining, by the location-based ratings server, if location information associated with the device can be obtained, the determining including:
receiving device data;
examining the device data received;
determining, based on the device data, whether the device is location-based-ratings-server compatible; and
determining, if the device is determined to be location-based-ratings-server compatible, that the location information can be obtained;
obtaining, by the location-based ratings server, if the location-based ratings server determines that location information associated with the device can be obtained, location information associated with the device, wherein obtaining the location information associated with the device comprises:
passing an identification string associated with the device to a user identification server, the user identification server comprising a home location register of the communications network;
recognizing received data as identification data associated with the device;
passing the identification data to a location server; and
recognizing received data as the location information associated with the device;
associating, by the location-based ratings server, the location information to the ratings data; and
storing, by the location-based ratings server, the ratings data and the location information in a storage medium.

7. The method of claim 6, further comprising recognizing, by the location-based ratings server, data received as a request for location information.

8. The method of claim 6, further comprising retrieving, by the location-based ratings server, account information being associated with the device and indicating a city and a state.

9. The method of claim 6, wherein associating the location information to the ratings data further comprises formatting, by the location-based ratings server, the location information as a data field in a database entry for the ratings data received from the device.

10. The method of claim 9, further comprising organizing, by the location-based ratings server, at least two ratings based upon the location information associated with the ratings.

11. A tangible computer-readable storage device comprising computer-readable instructions that, when executed by a processor, cause the processor to perform operations comprising:
recognizing data received at a first node of a communications network as ratings data submitted by the device;
determining, at the first node of the communications network, if location information associated with the device can be obtained, including;
receiving device data;
examining the device data received;
determining, based on the device data, whether the device is location-based-ratings-server compatible; and
determining, if the device is determined to be location-based-ratings-server compatible, that the location information can be obtained;
obtaining, if the first node of the communications network determines that location information associated with the device can be obtained, location information associated with a device in communication with the first node of the communications network, wherein the operations further comprise:
passing the identification string associated with the device to a second node of the communications network, the second node comprising a home location register;
recognizing data received from the second node of the communications network as identification data associated with the device;
passing the identification data to a third node of the communications network; and
recognizing data received from the third node of the communications network as location information, the location information comprising data indicating the location of the device;
associating the location information to the ratings data;
storing the ratings data and the location information in a storage medium;
and storing the ratings data without location information if the location information associated with the device cannot be obtained.

12. The tangible computer-readable storage device of claim 11, wherein the operations further comprise retrieving account information being associated with the device and indicating a city and a state.

13. The tangible computer-readable storage device of claim 12, wherein the operation of associating the location information to the ratings data formatting location information as a data field in a database entry for the ratings data received from the device.

14. The tangible computer-readable storage device of claim 13, wherein the operations further comprise organizing at least two ratings based upon the location information associated with the ratings.

* * * * *